United States Patent [19]

Verbiest

[11] Patent Number: 4,912,702
[45] Date of Patent: Mar. 27, 1990

[54] CONDITIONAL MULTIPLEXER

[75] Inventor: Willem J. A. Verbiest, Zwijndrecht, Belgium

[73] Assignee: Alcatel N.V., Amsterdam, Netherlands

[21] Appl. No.: 289,372

[22] Filed: Dec. 23, 1988

[30] Foreign Application Priority Data

Dec. 23, 1987 [BE] Belgium ............................... 8701481

[51] Int. Cl.$^4$ ............................................. H04J 3/22
[52] U.S. Cl. ..................................... 370/84; 370/94.1; 370/79
[58] Field of Search ..................... 370/84, 94, 60, 112, 370/79, 80, 83

[56] References Cited

U.S. PATENT DOCUMENTS 4,813,037 3/1989 Debuysscher et al. ............... 370/94

FOREIGN PATENT DOCUMENTS 0112953 7/1984 European Pat. Off. .............. 370/84
8804869 6/1988 World Int. Prop. O. .

Primary Examiner—Douglas W. Olms
Assistant Examiner—Alpus H. Hsu
Attorney, Agent, or Firm—Christie, Parker & Hale

[57] ABSTRACT

Conditional multiplexer wherein an input bitstream having a variable bitrate is allowed as part of a multiplexed output bitstream of input bitstreams or not depending on the result of an operation performed by processing means (TPR1) and which consists in calculating an estimated output bandwidth (B2) of said output bitstream from the mean values (mi) and variances (vi) of the probability distribution functions of the bitrates of said input bitstreams and in the subsequent comparison of said estimated output bandwidth (B2) with the maximum allowable output bandwidth (B). Further processing means (RPR1) continuously measure the mean and variance parameters and continuously verify if the sources of the bitstreams operate within the assigned bandwidths.

12 Claims, 3 Drawing Sheets

CONDITIONAL MULTIPLEXER

TECHNICAL FIELD

The present invention relates to a conditional multiplexer wherein an input bitstream having a variable bitrate is selectively output as part of a multiplexed output bitstream of an input bitstreams.

CROSS REFERENCE TO RELATED APPLICATIONS

Other copending applications that may be related to specific aspects of the present invention are the commonly assigned U.S. patent applications entitled "IMAGE PROCESSING SYSTEM AND PHASE-LOCKED LOOP USED THEREIN" Ser. No. 946,744 filed Dec. 24, 1986, now U.S. Pat. No. 4,833,543 dated May 23, 1989, corresponding to Belgian patent No. 904 101 and "INFORMATION TRANSMISSION SYSTEM" Ser. No. 144,410 filed Jan. 15, 1988, now U.S. Pat. No. 4,852,084 dated July 25, 1989, corresponding to Belgian patent No. 1 000 258; as well as the commonly assigned published International application designating the U.S. entited "PACKET SWITCHING NETWORK" (WO 88/04869, corresponding to Belgian patent No. 905 982). To the extent any such copending application may contain any additional information that might be of any assistance in the use and understanding of the invention claimed herein, it is hereby incorporated by reference.

CLAIM FOR PRIORITY

This application is based on and claims priority from an application first filed in Belgium on 12/23/87 under Ser. No. 8701481. To the extent such prior application may contain any additional information that might be of any assistance in the use and understanding of the invention claimed herein, it is hereby incorporated by reference.

BACKGROUND ART

The conditional multiplexer of the digital communication system disclosed in the above referenced commonly assigned published international application WO 88/04869 outputs a particular input bitstream as part of a candidate output bitstream formed from a plurality of input bitstreams in accordance with the result of an operation performed by processing means and which consists in calculating an estimated output bandwidth of said candidate output bitstream from the mean values of the probability distribution functions of the bitrates of said input bitstreams and in the subsequent comparison of said estimated output bandwidth with the maximum allowable output bandwidth or a function thereof.

In this known system, each time a path has to be set up towards an output terminal of a switching module for the transmission of an additional input bitstream or input packet stream, a path set up packet containing the mean value of the variable bitrate of this stream is supplied to the switching module. This path set up packet is the first of the input packet stream and precedes the data packets thereof. The latter will only be transmitted after the path set up packet has determined a path and this transmission will occur along this path. The processing means included in the switching module then calculates the estimated output bandwidth by adding the newly received mean value to the previously registered sum of the mean values of the input bitstreams already multiplexed on this output terminal and checks if this estimated bandwidth is below a predetermined percentage, e.g. 80%, of the maximum allowable bandwidth on this output terminal before allowing the path set up packet and later the other data packets of the additional input packet stream to be multiplexed on the output terminal.

It has been found that this known conditional multiplexer may give rise to a relatively high bit loss, apparently because the calculated estimated output bandwidth used to decide on the multiplexing of the input bitstreams is not sufficiently accurate.

DISCLOSURE OF INVENTION

An object of the present invention is to provide a conditional multiplexer of the above type, but having an improved accuracy.

According to the invention this object is achieved due to the fact that processing means also calculates said estimated output bandwidth from the variances of said probability distribution functions.

By using the mean as well as the variance for each of the bitstreams having a variable bitrate, the probability distribution function of this bitrate is more accurately characterized than by using solely the mean value, so that also the estimated bandwidth of the output bitstream calculated from these parameters and which is used to decide on the multiplexing of the input bitstreams is more accurate and therefore improves the bit loss performance.

Another characteristic feature of the present conditional multiplexer is that said bitstreams have variable bitrates and are generated by video sources.

In case these video sources are used for broadcasting applications, i.e. where a high image quality is required, the high quality level must be realised for the most complex image. When use is made of video sources having a fixed bitrate the latter has therefore to be equal to the peak value which is also the mean value, so that when the estimated output bandwidth is calculated from these mean values and the multiplexing is decided thereon a very inefficient use of the available output bandwidth is made. On the contrary, when the video sources used generate bitstreams having variable bitrates and are for instance of the type disclosed in the above-referenced copending U.S. application Ser. No. 144,410, the variable bitrate is function of the complexity of the image shot. But since such complex image scenes are rare the ratio of the mean and peak bitrates is relatively low. By calculating the estimated output bandwidth from the mean and variance parameters and deciding the multiplexing thereon a very efficient use of the available output bandwidth is made.

Another characteristic feature of the present conditional multiplexer is that said processing means calculate said estimated output bandwidth from the sum of said mean values and the sum of said variances.

Yet another characteristic feature of the present conditional multiplexer is that said processing means calculate said estimated output bandwidth as a function of a predetermined bit loss probability.

In this way, when the processing means allow a plurality of input bitstreams to be multiplexed to a single output terminal, it is ensured, with a desired probability, that the bit loss will not exceed a predetermined value.

Still another characteristic feature of the present conditional multiplexer is that processing means calculates said estimated output bandwidth also from the predetermined output bandwidth corresponding to said predetermined bit loss probability in the cumulative normal distribution function for which the mean and the variance are equal to 0 and 1 respectively.

The invention is based on the insight that the output bandwidth having the predetermined bit loss probability in the corresponding cumulative normal probability distribution function with a mean and a variance equal to the above sums may be derived from the estimated output bandwidth having the same bit loss probability in the standard cumulative normal distribution function having a mean and a variance equal to 0 and 1 respectively.

The present invention also relates to a conditional multiplexer wherein an input bitstream having a variable bitrate is selectively output as part of a multiplexed output bitstream of input bitstreams or not depending on the result of an operation performed by processing means controlled by previously received parameters associated with said input bitstreams.

The above-referenced International Patent Publication WO 88/04869. Therein the parameter received for each input bitstream is the mean bitrate of this bitstream and this parameter is used by the processing means to decide whether this bitstream may be multiplexed with other bitstreams already transmitted on a same output terminal. However, if this parameter does not correspond to the bitrate actually transmitted and the latter is too high this may give rise to an overload on the output terminal.

Accordingly another object of the present invention is to provide an improved such conditional multiplexer which prevents such an erroneous operation.

According to the invention this object is achieved due to the fact that further processing means are provided which determine said parameters from said input bitstreams, compare them with said received parameters and process said input bitstreams in function of the result of this comparison.

In this way the further processing means are able to detect an erroneous operation and may then start the execution of appropriate corrective measures.

BRIEF DESCRIPTION OF DRAWINGS

The above mentioned and other object and features of the invention will become more apparent and the invention itself will be best understood by referring to the following description of an embodiment taken in conjunction with the accompanying drawing wherein.

BEST MODE FOR CARRYING OUT THE INVENTION

First it should be noted that all the mathematical relations used in the description are mentioned in the last page thereof and that in what follows i, j, i−1 and j−1 are being used as indices.

The digital communication system shown is of the type disclosed in the above mentioned Belgian patent No. 905 982. It includes a multi-stage broadband packet switching network BSN having a plurality of input terminals I1/N and a plurality of output terminals O1/N, as well as a plurality of user stations US1/N each comprising a sender equipment SE1/N and a receiver equipment RE1/N. The sender equipments SE1/N are coupled to the input terminals I1/N of BSN via respective asynchronous time division (ATD) input transmission links TL1/N and respective input interface circuits II1/N. The output terminals O1/N of BSN are coupled to the receiver equipments RE1/N through respective output interface circuits OI1/N and respective ATD output transmission links OL1/N.

In the packet switching network BSN the N input terminals I1/N are coupled to the N output terminals O1/N via a number of cascaded stages of switching modules of which only one, BSE, is shown. This switching module is also of the type disclosed in the above mentioned Belgian patent No. 905 982 and has 8 input terminals R1/8 which are connected to respective output terminals of a preceding stage (not shown), 8 output terminals T1/8 which are connected to respective input terminals of a following stage (not shown), a Time Division Multiplex (TDM) bus TB, controlled by a bus control unit TM, and a switch port control bus SB. The input terminals R1/8 are linked via respective receive ports RX1/8 to the bus TB which is further coupled to 8 transmit ports TX1/8 each connected to a respective output terminal T1/8. Each receive port RX1/8 is also bidirectionally connected to a respective switch port controller SC1/8 and all these controllers and the transmit ports TX1/8 are linked by the bus SB.

Figure 2:
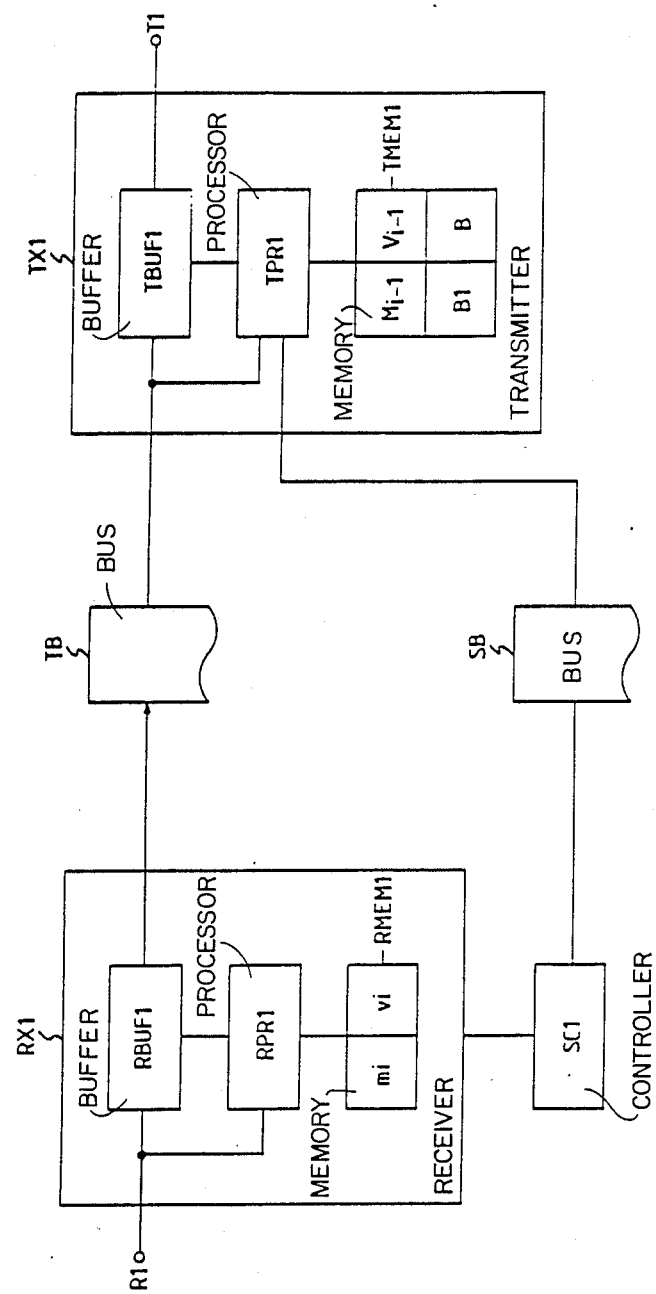
FIG. 2 represents part of FIG. 1 in more detail.

Because the receive ports RX1/8 are identical and the same is true for the transmit ports TX1/8, only RX1 and TX1 are represented in some detail in FIG. 2. RX1 includes a receive buffer circuit RBUF1, a processor RPR1 and a memory RMEM1, whilst TX1 includes a transmit buffer TBUF1, a processor TPR1 and a memory TMEM1. All these elements are interconnected as shown. The memory RMEM1 stores the mean and variance parameters mi and vi which will be considered later, whilst the memory TMEM1 stores the parameters Mi-1, Vi-1, B1 and B relating to a multiplexed output bitstream on the output terminal T1 where:

Mi-1 is the sum of the mean values of the probability distribution functions of the bitrates of the i-1 input bitstream which are part of this multiplexed output bitstream;

Vi-1 is the sum of the variances of these i-1 input bitstreams;

B is maximum allowable output bandwidth;

B1 is the output bandwidth for which the normalized or standard cumulative normal probability distribution function, characterized by a mean value equal to 0 and a variance equal to 1, indicates that this bandwidth will not be exceeded with a probability equals to 1-PLR wherein PLR is the bit loss or the packet loss.

It is assumed that each of the user stations US1/N is a video station of the type disclosed in the above-referenced copending U.S. application Ser. No. 946,744 and the above-referenced copending U.S. application Ser. No. 144,410.

When an image is shot by a sender equipment the latter generates a bitstream wherein the bits are assembled into data packets of 280 bits and wherein the packets have a frequency which is function of the image complexity. In each such packet the bits follow each other at a predetermined maximum bitrate of e.g. 560 Megabit/sec, but since the packet frequency is a function of the image complexity, the bit rate of the bitstream or packet stream is smaller than 560 Megabit/sec and variable.

The bitstreams or packet streams having variable bitrates thus generated by the various sender equipments SE1/N are supplied to the input terminals I1/N of the switching network BSN via the incoming ATD links IL1/N and input interface circuits II1/N. Therein the format of the packets received is adapted to the format used in the switching network. In each of the switching modules of this network, such as BSE, an incoming data packet arriving at any of its input terminals R1/8 is stored in the buffer circuit of the associated receive port RX1/8 prior to being transmitted into the buffer circuit of a selected one of the transmitter ports TX1/8 via the bus TB and under the control of the bus control unit TM. This transmitter port has been previously selected by a switch port controller SC1/8 upon the receipt of a path set up packet which always preceeds a stream of data packets. From the output buffer circuits of the transmit ports TX1/8 the data packets are supplied to the output terminals O1/N via the output interface circuits OI1/N wherein the format of the packets appearing on these output terminals O1/N is modified before applying them to the outgoing ATD links OL1/N. From there the packets are applied to the receiver equipments RE1/N wherein they are converted into respective images.

A path set up packet mentioned above is generated by each sender equipment SE1/8 as the first packet of a stream of packets and preceeds the data packets thereof. It is used to determine a path through the network BSN. Such a path set up packet includes, amongst other information described in the above-referenced Belgian patent 905982, the mean and variance parameters mi and vi which characterize the probability distribution function of the variable bitrate at which data packets belonging to the same communication as the path set up packet will afterwards be transmitted on the path.

When such a path set up packet is received on one of the input terminals R1/8 of the receive ports RX1/8 of BSE, for instance on R1, it is stored in the buffer circuit of this port, e.g. in the buffer circuit RBUF1 of RX1. The processor RPR1 associated with RBUF1 then reads the mean and variance parameters mi and vi contained in the set up packet and stores them in the memory RMEM1. The switch port controller SC1 associated with RX1 then selects a transmit port of the group TX1/8, e.g. TX1, subsequently reads the parameters mi and vi from RMEM1 and finally transfers them to processor TPR1 of TX1. The latter than checks if the ith packet input stream, of which the above path set up packet is the first one, may be multiplexed on the output terminal T1, in addition to the i-1 data packet input streams, already multiplexed thereon, to form a resultant data packet output stream comprising i data packet input streams.

For an adequate number of i independent input streams of data packets generated by video sources operating at variable bitrates, the probability distribution function of the variable bitrate of this data packet output stream may be assumed to be substantially a normal one characterized by its mean value Mi and its variance Vi. The parameters Mi and Vi of the data packet output stream are then respectively equal to the sum of the mean and variance values characterizing the i data packet input streams.

As already mentioned, each time a path set up packet constituting the first packet of an i th input packet stream is received in the buffer current RBUF1 of RX1 and when this i th stream has possibly to be multiplexed on the same output terminal T1 with the i-1 previously received data packet input streams, the switch port controller SC1 transmits the mean and variance values mi and vi contained in the new path set up packet to the processor TPR1 of TX1 via the bus SB. From the previously calculated sum values Mi-1 and Vi-1 stored in the memory TMEM1 of the transmit port TX1, this processor first calculates the new values from relation (1):$M_i = M_{i-1} + mi$ and relation (2):$V_i = V_{i-1} + V_i$ afterwards it calculates the estimated output bandwidth from relation (3):$B_2 = B_1 \cdot V_i^{\frac{1}{2}} + M_i$ and compares this bandwidth with the maximum bandwidth B allowable on the output terminal T1. It then informs via the bus SB the switch port controller SC1 of the result of this comparison and the latter then executes the operations already described in the the above-referenced International Patent Publication WO 88/04869. For instance, when the multiplexing of the i th packet stream is allowed the set up packet stored in RX1 is transmitted to TX1 via the bus TB and then multiplexed on T1. If not, the path set up packet searches for another path. When this packet has been able to determine a path through the network the other data packets will be transmitted along this path and be multiplexed on the same output terminals as the path set up packet, etc.

The above comparison operation performed by the processor TPR1 part of the conditional multiplexer is justified as follows.

Because the probability distribution function of the variable bitrate of the output bitstream multiplexed on T1 has been assumed to be a normal probability distribution function, and if we would know the corresponding cumulative normal probability distribution function of this bitrate, characterized by the mean Mi and the variance Vi, the latter function would indicate for each estimated output bandwidth the probability that it will not be exceed and vice-versa. Hence, this function would indicate for the above mentioned probability 1-PLR an estimated output bandwidth B2.

The above comparison is now based on the insight that although the cumulative normal probability distribution function is not known, the value B2 may be derived from the corresponding value B1 of the known normalized or standard cumulative normal probability distribution function, i.e. for which the mean is zero and the variance is 1. Indeed, for a same probability the normalized parameter B1 is tied to B2 by the linear relation (4):$(B_2 - M_i)/V_i^{\frac{1}{2}} = B_1$ so that the estimated bandwidth B2 on the output T1 and not to exceed the maximum allowable bandwidth B is given by (3) above.

As described above, each of the video sources communicates the mean mi and variance vi characterizing the probability distribution function of its bitrate to the switching network BSN when a path set up packet is transmitted to this network. However, if such a video source does not operate within the assigned bandwidth during the subsequent transmission of data packets it can overload the network. To prevent this, each of the receive ports of the switching modules at the border of the network exercises during each data packet transmission period a so-called guard function which consists in checking whether the signal source coupled to it operates within the assigned bandwidth and in taking appropriate counter measures when this bandwidth is exceeded. This is described hereinafter.

Supposing that the switching module BSE is located at the border of the network, i.e. when its terminals R1/8 are connected to terminals T1/8 respectively, each of the processors included in the receive ports RX1/8 thereof checks if the value of the mean and variance parameters of the data packet stream supplied to it from the video source included in the respective user station US1/8 correspond to the values mi and vi of these parameters which have previously been communicated to it by a path set up packet and have been stored in the memory RMEM1.

Figure 3:
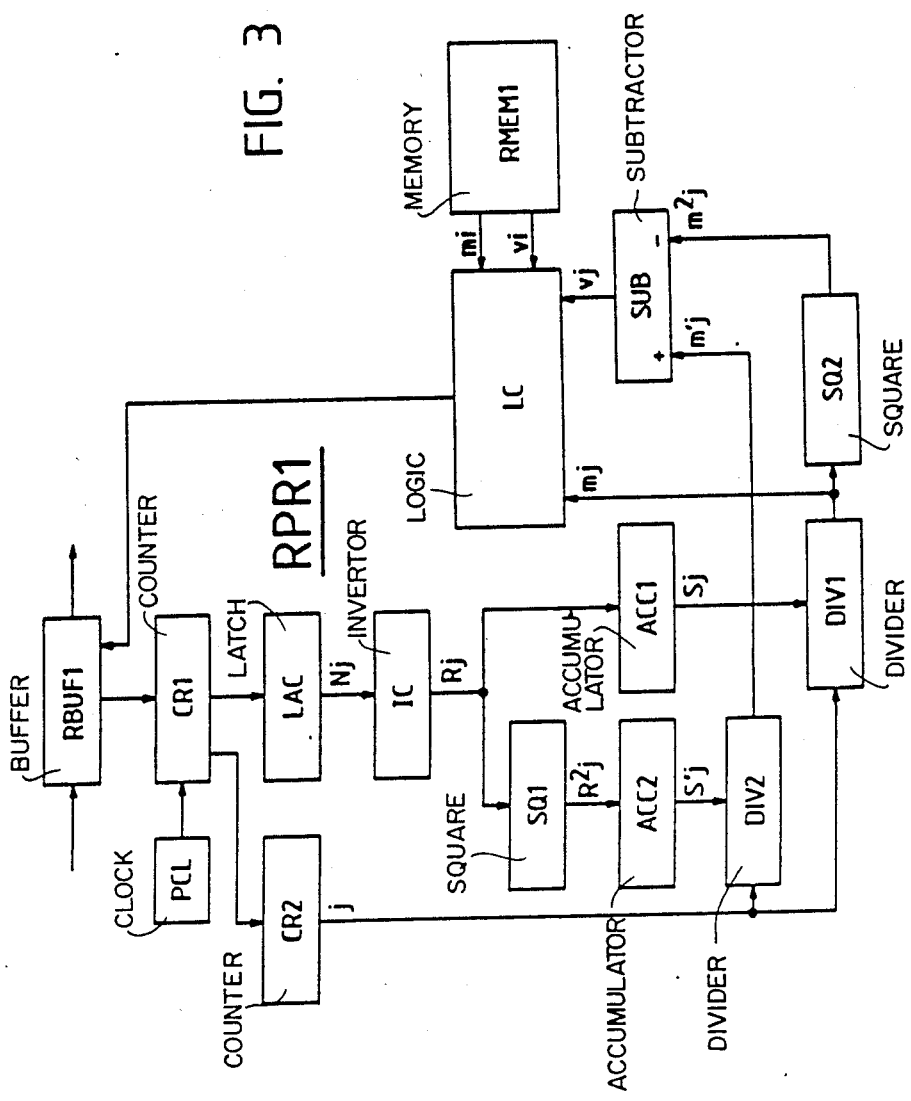
FIG. 3 represents processor RPR1 of FIG. 2 in more detail.

More particularly, in the receive port RX1 this checking operation is performed by the processor RPR1 which as shown in detail in FIG. 3 includes a packet clock circuit PCL, counters CR1 and CR2, a latch circuit LAC, an inverting circuit IC, squaring circuits SQ1 and SQ2, accumulator circuits ACC1 and ACC2, divider circuits DIV1 and DIV2, a subtractor circuit SUB and a logic circuit LC. All these circuits are interconnected as shown. As also represented in this figure the buffer circuit RBUF1 of FIG. 2 has an output coupled to CR1 and an input connected to LC which has inputs connected to outputs of the memory circuit RMEM1 of FIG. 2. The packet clock PCL provides clock pulses at the rate of the packet time slots. This packet rate is 280 times smaller than the bitrate because each packet contains 280 bits. The packet clock PCL pulses are supplied to the counter CR1 which is therefore stepped at the packet rate.

The processor RPR1 operates as follows at the receipt of each data packet, e.g. the j th one, in the buffer circuit RBUF1, and assuming that:

the accumulators ACC1 and ACC2 already respectively store the accumulated sum $SR_{j-1}$ of the j-1 previously calculated values R to $R_{j-1}$ and the accumulated sum $S'_{j-1}$ of the squares of those value, each of those values $R_1$ to $R_{j-1}$ representing an instantaneous bitrate, as will be explained later;

the counter CR2 stores the value j-1;

the memory RMEM1 stores the value mi and vi, as already mentioned.

When the j th data packet is received in the receive buffer circuit RBUF1 the latter first authorizes the transfer of the contents Nj of the counter CR1 into the latch circuit LAC and then resets this counter CR1 to zero. This means that Nj is equal to the number of packet time slots elapsed since the receipt of the preceeding (j-1) th data packet, inclusive the time slot of the j th packet. From the value Nj the inverter circuit IC then calculates the instanteous bitrate value Rj according to formula (5):$R_j = N_j^{-1}$.

When the transfer of Nj from CR1 to LAC is performed the counter CR2 is stepped to its j th position thus indicating that the j th packet has been received in RBUF1.

From the thus calculated instantaneous bitrate value Rj and from the accumulated sums stored in ACC1 and ACC2 respectively, the processor RPR1 calculates the new accumulated sum Sj2 by adding Rj to Sj-1 as well as the new accumulated sum S'j by first squaring Rj in the squaring circuit SQ1 and then adding the square to S'j. The thus obtained values Sj and S'j are then divided by j in the divider circuits DIV1 and DIV2 which respectively provide the mean mj of the values R1 to Rj and the mean m'j of the squares of these values.

With the help of these values mj and m'j the processor RPR1 then calculates the new variance value vj by first squaring mj in the squaring circuit SQ2 and then subtracting this square from m'j in the subtractor circuit SUB, vj is thus given by the relation (6):$v_j = m^1 j - m^2 j$.

This relation is based on the insight that it follows from the theory of probabilities that the variance of the normal probability distribution function having a plurality of discrete values, such as R1 to Rj, is equal to the mean m'j of the squares of these values less the square of the mean mj thereof.

In the logic circuit LC the measured values mj and vj are compared with the respective values mi and vi stored in the memory RMEM1. When from this comparison it follows that the bitrate determined by mj and vj is higher than that determined by mi and vi in inhibition signal is applied to the receive buffer RBUF1 to prevent the data packet stored therein from being transmitted to the transmit port TX1. By this corrective measure the bitrate is decreased.

Instead of proceeding in this way the processor RPR1 could also inform the corresponding video source of the fact that it operates outside the bandwidth assigned to it and should take actions to correct this situation.

The above guard function may also be executed by a processor in the user stations.

In case the data packets of the stream generated in such a station are for instance obtained by a layered coding operation such as described in Belgian patent application No. 8700027 a processor in the user station may perform a smooth corrective action by dropping data packets of the higher layer, i.e. those giving detailed image information in contrast to those of the lower layer which contain more basic image information.

In the above described example the guard function is performed in a user station or in each receive port of a switching module at the border of the network, so that the operation of only one video source is checked. However, the guard function may also be performed in the receive ports of a switching module which is not at the border of the network. In this case the operation of all the video source using this receive port have to be checked.

While the principles of the invention have been described above in connection with specific apparatus, it is to be clearly understood that this description is made only by way of example and not as a limitation on the scope of the invention.

I claim:

1. In a conditional multiplexer for selectively multiplexing a particular input bitstream having a variable bitrate as part of a candidate multiplexed output bitstream formed from a plurality of input bitstreams: processing means for calculating an estimated output bandwidth of said candidate output bitstream from not only the mean values of the probability distribution functions of the bitrates of said input bitstreams including said particular input bitstream but also the variances of said probability distribution functions and for then comparing said estimated output bandwidth with a function of the allowable maximum output bandwidth, and multiplexing means responsive to said processing means for multiplexing said particular input bitstream as part of said candidate multiplexed output bitstream if and only if said estimated output bandwidth is not greater than said function of the allowable maximum output bandwidth.

2. Conditional multiplexer according to claim 1, wherein said processing means calculates said estimated output bandwidth from the sum of said mean values and the sum of said variances.

3. Conditional multiplexer according to claim 1, wherein said processing means calculates said estimated output bandwidth based on a predetermined bit loss probability.

4. Conditional multiplexer according to claim 3, wherein said processing means calculates said estimated output bandwidth using a predetermined output bandwidth corresponding to said predetermined bit loss probability in a cumulative normal distribution function for which the mean and the variance are equal to 0 and 1 respectively.

5. Conditional multiplexer according to claim 4, wherein
said processing means calculates said estimated output bandwidth from the sum of said mean values and the sum of said variances, and
said estimated output bandwidth is equal to $$B1 \cdot Vi^{\frac{1}{2}} + Mi$$

wherein B1 is said predetermined output bandwidth and Mi and Vi are said sums of said mean values and of said variances respectively.

6. Conditional multiplexer according to claim 3, wherein:
the bits of each of said input bitstreams are assembled into packets so as to form a packet stream comprising a plurality of data packets and at least one control packet,
said mean and variance of said input bitstream are communicated to said processing means by means of a control packet constituting the first packet of said packet stream and
said predetermined bit loss probability corresponds to a predetermined packet loss probability.

7. Conditional multiplexer according to claim 1, wherein said input bitstreams have variable bitrates and are generated by vide sources.

8. Conditional multiplexer according to claim 6, further comprising
second processing means for measuring instantaneous bitrate values at the receipt of said data packets and deriving therefrom actual parameters comprising the mean and variance of said instantaneous bitrate values,
logic means responsive to said second processing means, for comparing said actual parameters with said received parameters and
control means responsive to said logic means, for further processing of said particular input bitstream as a function of the result of that comparison.

9. Conditional multiplexer according to claim 8, wherein said second processing means measures said variance by calculating the mean of the squares of each of said instantaneous bitrate values and then calculating the difference between the mean of said squares and the square of the mean of said bitrate values.

10. In a conditional multiplexer for multiplexing a particular input bitstream having a variable bitrate as part of an output bitstream determined in response to received bitrate mean and variance parameters included in said input bitstreams:
processing means for deriving actual bitrate mean and variance parameters of said input bitstreams, and
logic means responsive to said processing means, for comparing said actual bitrate mean and variance parameters with said received bitrate mean and variance parameters and
control means responsive to said logic means, for controlling the further processing of said input bitstreams as a function of the result of that comparison.

11. Conditional multiplexer according to claim 10, wherein
said received parameters define the estimated mean and variance of the variable bitrate of the input bitstream, and
said control means decreases said variable bitrate of said particular input bitstream when the result of said comparison indicates that the actual bitrate of the particular input bistream is higher than that corresponding to the received mean and variance parameters.

12. Conditional multiplexer according to claim 10, wherein
said particular input bitstream is generated by a video source which codes images with different accuracies and
as a function of the result of said comparison said control means causes said video source to drop data relating to images coded with a higher accuracy.

* * * * *

UNITED STATES PATENT AND TRADEMARK OFFICE
CERTIFICATE OF CORRECTION

PATENT NO. : 4,912,702

DATED : March 27, 1990

INVENTOR(S) : Willem J. A. Verbiest

Figure 1:
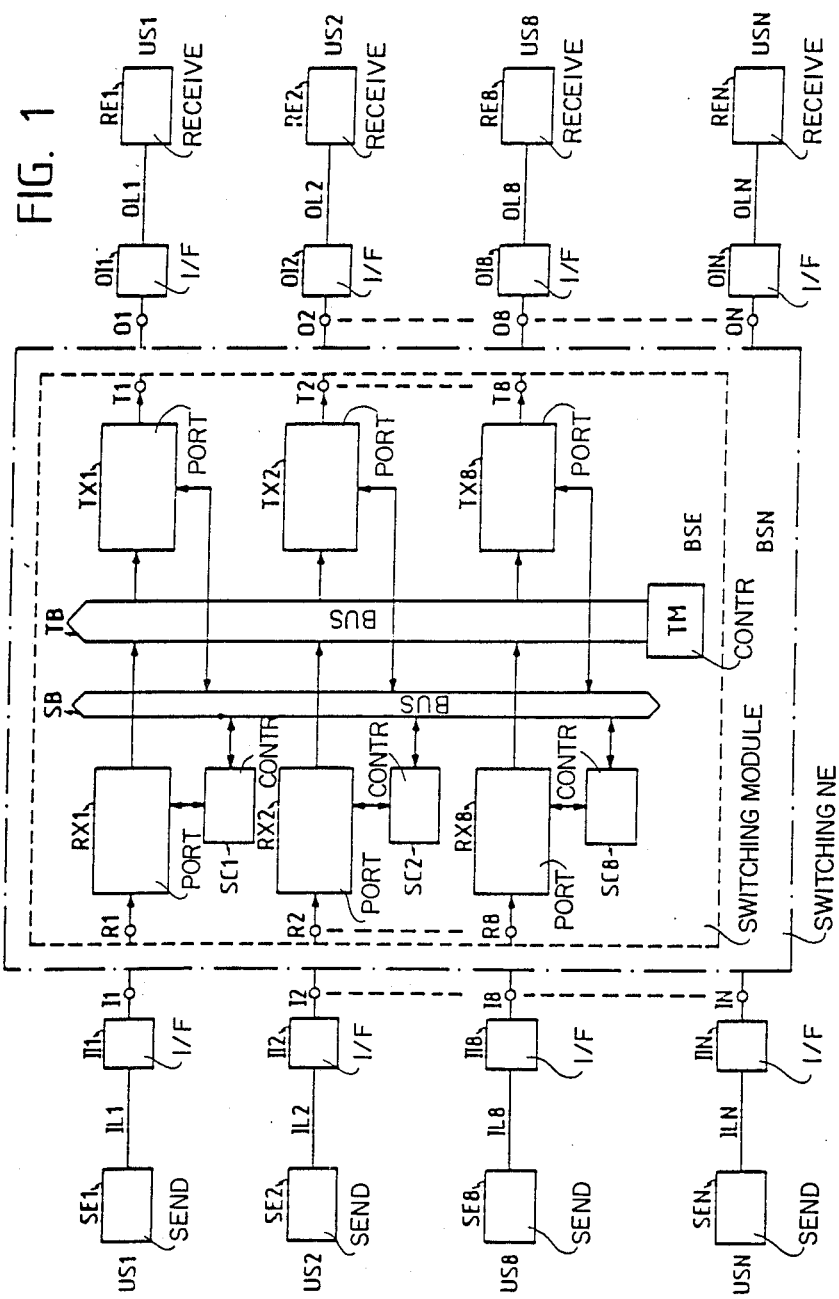
FIG. 1 represents a digital communication system using a conditional multiplexer according to the invention.

It is certified that error appears in the above-identified patent and that said Letters Patent is hereby corrected as shown below:

In the Drawings:

FIG. 1, at the bottom of the figure change "SWITCHING NET" to -- SWITCHING NETWORK --.

Column 1, line 24, change "entited" to -- entitled --.

Column 2, line 58, after "is" and before "function" insert -- a --.

Column 3, line 22, before "above-referenced" delete -- The -- and insert -- Such a conditional multiplexer is already known from the --.

Column 4, line 54, change equals" to -- equal --.
Column 4, line 64, after "is" and before "function" insert -- a --.
Column 5, line 19, change "preceeds" to -- precedes --.
Column 5, line 30, change "preceeds" to -- precedes --.

Column 6, line 39, change "exceed" to -- exceeded --.

Column 7, line 3, change "T1/8" to -- I1/8 -- --.
Column 7, line 35, change "R" to -- R1 --.
Column 7, line 40, change "value" to -- values --.
Column 7, lines 47,48, change "preceeding" to -- preceding --.

UNITED STATES PATENT AND TRADEMARK OFFICE
CERTIFICATE OF CORRECTION

PATENT NO. : 4,912,702

DATED : March 27, 1990

INVENTOR(S) : Willem J. A. Verbiest

It is certified that error appears in the above-identified patent and that said Letters Patent is hereby corrected as shown below:

Column 9, line 44, change "vide" to -- video --.

Column 10, line 37, change "bistream" to -- bitstream --.

Signed and Sealed this

Twelfth Day of May, 1992

Attest:

DOUGLAS B. COMER

*Attesting Officer*   Acting Commissioner of Patents and Trademarks